United States Patent
Saieg et al.

(10) Patent No.: US 8,006,987 B2
(45) Date of Patent: Aug. 30, 2011

(54) CAST TRAILING ARM ASSEMBLY FOR TRAILER SUSPENSION

(75) Inventors: Steven George Saieg, Rochester Hills, MI (US); Craig Allen Holt, Chesterfield, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 1697 days.

(21) Appl. No.: 10/916,127

(22) Filed: Aug. 11, 2004

(65) Prior Publication Data
US 2006/0033302 A1    Feb. 16, 2006

(51) Int. Cl.
*B60G 9/02*    (2006.01)
(52) U.S. Cl. ............................................... 280/124.116
(58) Field of Classification Search .......... 280/124.116, 280/124.128, 124.129, 124.13, 124.133, 280/124.153
See application file for complete search history.

(56) References Cited

U.S. PATENT DOCUMENTS

| | | | |
|---|---|---|---|
| 2,153,233 A * | 4/1939 | Best .................... | 280/124.153 |
| 4,415,179 A | 11/1983 | Marinelli | |
| 5,690,353 A * | 11/1997 | Vandenberg ........... | 280/124.116 |
| 6,241,266 B1 * | 6/2001 | Smith et al. ............ | 280/124.116 |
| 6,557,875 B2 * | 5/2003 | Schlosser et al. ...... | 280/124.153 |
| 7,048,288 B2 * | 5/2006 | Chan et al. .............. | 280/124.116 |
| 7,086,655 B2 * | 8/2006 | Chan et al. .............. | 280/124.116 |
| 2003/0146592 A1 * | 8/2003 | Chalin et al. ........... | 280/124.116 |
| 2004/0080132 A1 | 4/2004 | Chan et al. | |
| 2004/0183271 A1 * | 9/2004 | Galazin et al. ......... | 280/124.128 |

FOREIGN PATENT DOCUMENTS

| | | | |
|---|---|---|---|
| GB | 2367272 A | * | 4/2002 |
| GB | 2367273 A | * | 4/2002 |
| GB | 2396140 A | * | 6/2004 |
| WO | WO 2004/054825 | | 7/2004 |

OTHER PUBLICATIONS

European Search Report, Oct. 10, 2005.

* cited by examiner

*Primary Examiner* — Eric Culbreth
(74) *Attorney, Agent, or Firm* — Carlson, Gskey & Olds

(57) ABSTRACT

A trailing arm assembly for a suspension includes at least first and second cast components. The first and second cast components are welded to each other to substantially surround an outer perimeter of an axle member. The first cast component is then welded to one side of the axle member at a first weld and the second cast component is welded to an opposite side of the axle member at a second weld. One of the first and second cast components includes an integrally formed air spring seat and the other of the first and second cast components includes an integrally formed bushing housing for connection to a frame.

23 Claims, 3 Drawing Sheets

CAST TRAILING ARM ASSEMBLY FOR TRAILER SUSPENSION

TECHNICAL FIELD

The subject invention relates to a trailing arm assembly for a suspension that includes at least two cast components that are welded to an axle member.

BACKGROUND OF THE INVENTION

A suspension system includes a pair of trailing arm assemblies that are attached to an axle beam member. One trailing arm assembly is positioned near one end of the axle beam member and another trailing arm assembly is positioned near an opposite end of the axle beam member. The trailing arm assemblies are pivotally connected to a vehicle frame member at a first end and support air springs at a second end. The trailing arm assemblies are attached to the axle beam member at a position between the first and second ends. The trailing arm assemblies need to be lightweight and must be capable of operating under high load conditions.

Traditionally, each trailing arm assembly is manufactured from a plurality of stamped pieces of sheet metal that are welded together, and which are welded to the axle beam member. Depending on the type of trailing arm assembly, as many as ten (10) or more pieces are required to form each trailing arm assembly. Performing the welding operations to attach these pieces together is an expensive and time-consuming process. Further, each weld joint area provides a potential failure initiation point. Improperly welded joints can result in premature cracking and joint failure due to shock loads or overloading.

Thus, it is desirable to provide a trailing arm assembly for a suspension that is lightweight and high strength and that reduces the number of welded joint areas. The trailing arm assembly should also have fewer components and be less time consuming to assemble, as well as overcoming the other above-mentioned deficiencies in the prior art.

SUMMARY OF THE INVENTION

A trailing arm assembly for a suspension includes at least first and second cast components. The first and second cast components are welded to each other to substantially surround an outer perimeter of an axle member. The first cast component is welded to one side of the axle member at a first weld and the second cast component is welded to an opposite side of the axle member at a second weld.

In one example, the first cast component includes an integrally formed air spring seat and the second cast component includes an integrally formed bushing housing for connection to a frame bracket. The second cast component has an upper surface, a pair of vertical side walls extending downwardly from opposing edges of the upper surface, and an open bottom. The upper surface and pair of vertical side walls define an internal cavity. The second weld is accessible via this internal cavity. Once the second cast component is welded to the axle member at the second weld, a bottom plate is welded to the second cast component to substantially enclose the internal cavity.

In another example, the trailing arm assembly includes a third cast component that is welded to the second cast component. The third cast component includes an integrally formed bushing housing at one end and an integrally formed tubular portion at an opposite end. The integrally formed bushing housing is connected to a frame bracket. The integrally formed tubular portion is welded to the second cast component after the second cast component is welded to the axle component at the second weld. The first cast component includes an integrally formed air spring seat that supports a suspension air spring.

The subject invention provides a lightweight and high strength trailing arm assembly having fewer components, and which is less expensive and time consuming to assemble compared to prior designs. These and other features of the present invention can be best understood from the following specification and drawings, the following of which is a brief description.

DETAILED DESCRIPTION OF THE PREFERRED EMBODIMENT

Figure 1:
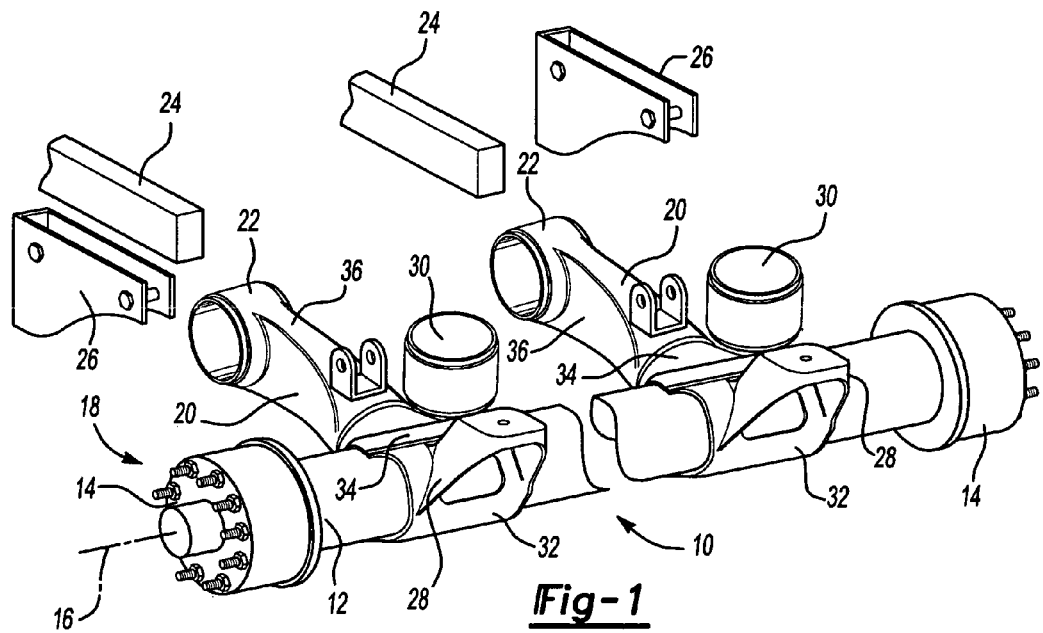
FIG. 1 is a perspective view of an axle and pair of trailing arm assemblies incorporating the subject invention.

An axle assembly 10 is shown in FIG. 1. The axle assembly includes an axle beam 12 extending laterally between a pair of wheel ends 14. The axle beam 12 defines a lateral axis of rotation 16. The wheel ends 14 support tires (not shown) that rotate about the lateral axis of rotation 16.

The subject invention provides a suspension assembly, shown generally at 18, that includes a pair of unique trailing arms 20 that are laterally spaced apart from each other. Each trailing arm 20 includes a first end 22 that is pivotally connected to a vehicle frame member 24 with a connector assembly 26, and a second end 28 that supports a suspension component 30.

In one example, the axle beam 12 is a tube for a trailer axle assembly, however, it should be understood that the suspension assembly 18 with the unique trailing arms 20 could also benefit suspensions for other axles such as drive or non-drive steer axles, single drive axles, tandem drive axles, tag axles, etc. When used with a trailer axle assembly, the vehicle frame member 24 is a trailer frame member, the connector assembly 26 is typically a frame bracket assembly, and the suspension component 30 is typically an air spring. It should be understood that the connector assembly 26 and suspension component 30 are just examples, and that other connector configurations and suspension components known in the art could be used in place of the drop link assembly and air spring. Further, the suspension assembly 18 includes additional components to complete the suspension assembly 18 that are not shown, but are well known in the art.

Each trailing arm 20 includes a first cast component 32, a second cast component 34, and a third cast component 36. The first 32 and second 34 cast components are welded to each other and then are separately welded to the axle beam 12. The first 32 and second 34 cast components substantially surround the axle beam 12 after welding. The third cast component 36 is then welded to the second cast component 34.

Figure 2:
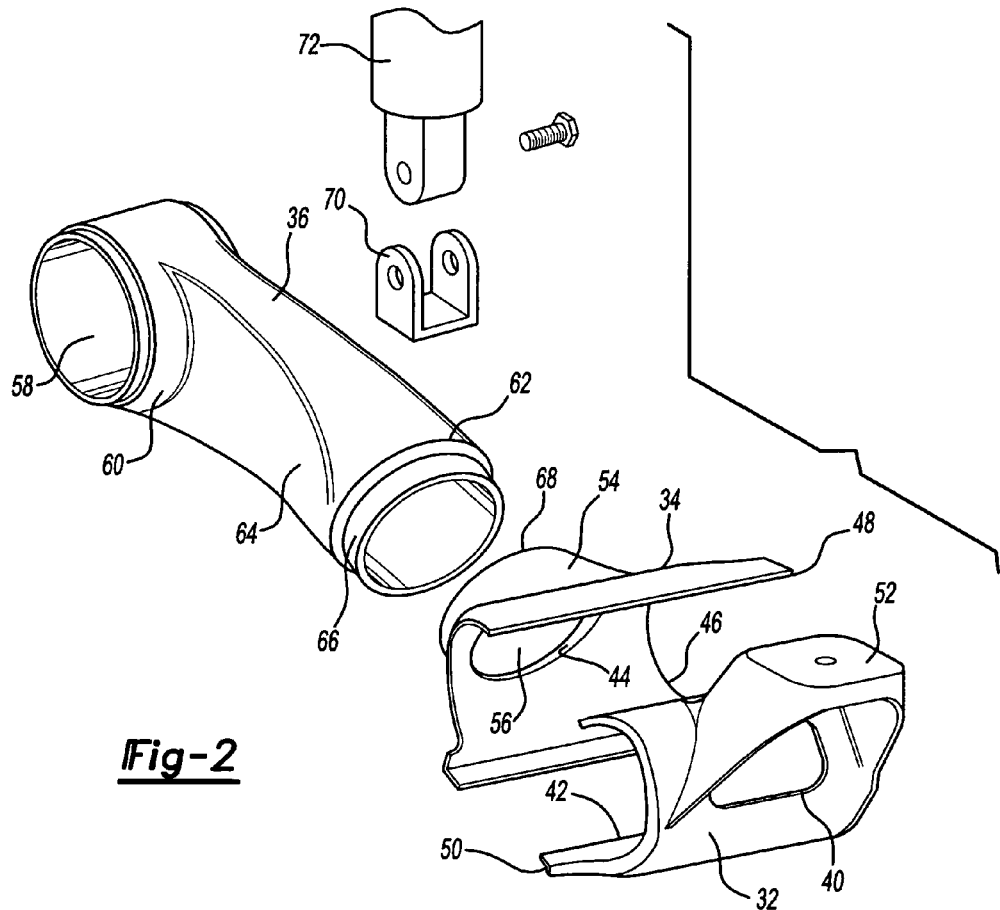
FIG. 2 is an exploded view of one trailing arm assembly from FIG. 1.
Figure 3:
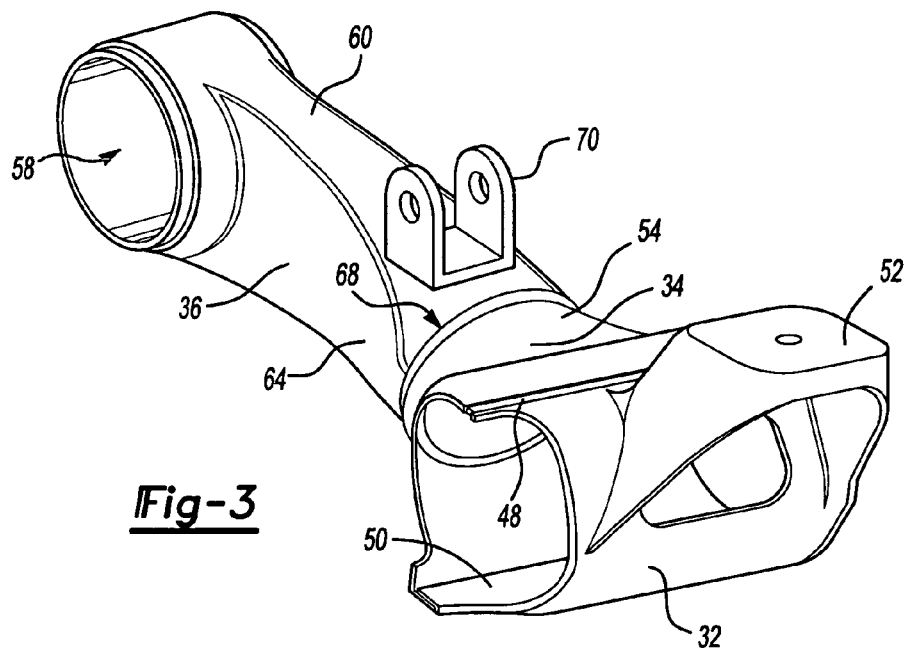
FIG. 3 is a perspective view of the trailing arm assembly of FIG. 2.

The first 32, second 34, and third 36 cast components are shown in greater detail in FIGS. 2 and 3. The first 32 and second 34 cast components include weld areas for attachment to the axle beam 12. Any type of welded joint or welding process known in the art can be used to attach the weld areas to the axle beam 12. In one example, the first cast component 32 includes a first window weld area 40 and defines an inner surface 42 that substantially surrounds one side of the axle beam 12. The second cast component 34 includes a second window weld area 44 and defines an inner surface 46 that substantially surrounds an opposite side of the axle beam 12. The first 32 and second 34 cast components are welded to each other at 48, 50. The first cast component 32 is then welded to the axle beam 12 via the first window weld area 40 and the second cast component 34 is welded to the axle beam 12 via the second window weld area 44. Throughout this application, it should be understood that the window welds preferably extend all around the periphery of the openings. However, other weld joints would come within the definition of a window weld.

The first cast component 32 includes an integrally formed air spring seat 52 that supports the suspension component 30. The second cast component 34 includes an integrally formed tubular portion 54 that defines an opening 56. The third cast component 36 includes a bushing housing 58 that is integrally formed at one end 60 and a tubular portion 62 that is integrally formed at an opposite end 64. The tubular portion 62 includes a reduced diameter area 66 that has a smaller diameter than opening 56.

The second window weld area 44 is accessible through the opening 56. Once the second cast component 34 is welded to the axle beam 12, the third cast component 36 is welded to the second cast component 34. More specifically, the reduced diameter area 66 is inserted into the opening 56, and the tubular portions 54, 62 are welded together at 68.

A shock absorber bracket 70 is then welded to the third cast component 36. The shock absorber bracket 70 mounts a shock absorber 72 between the connector assembly 26 and the suspension assembly 18 as known.

Figure 4:
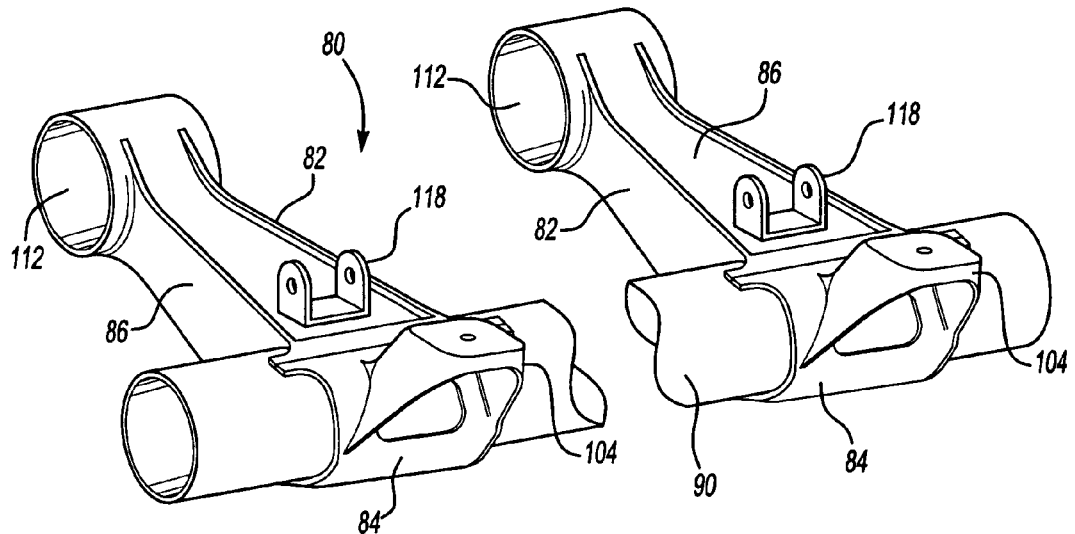
FIG. 4 is a perspective view of another example of an axle and pair of trailing arm assemblies incorporating the subject invention.
Figure 5:
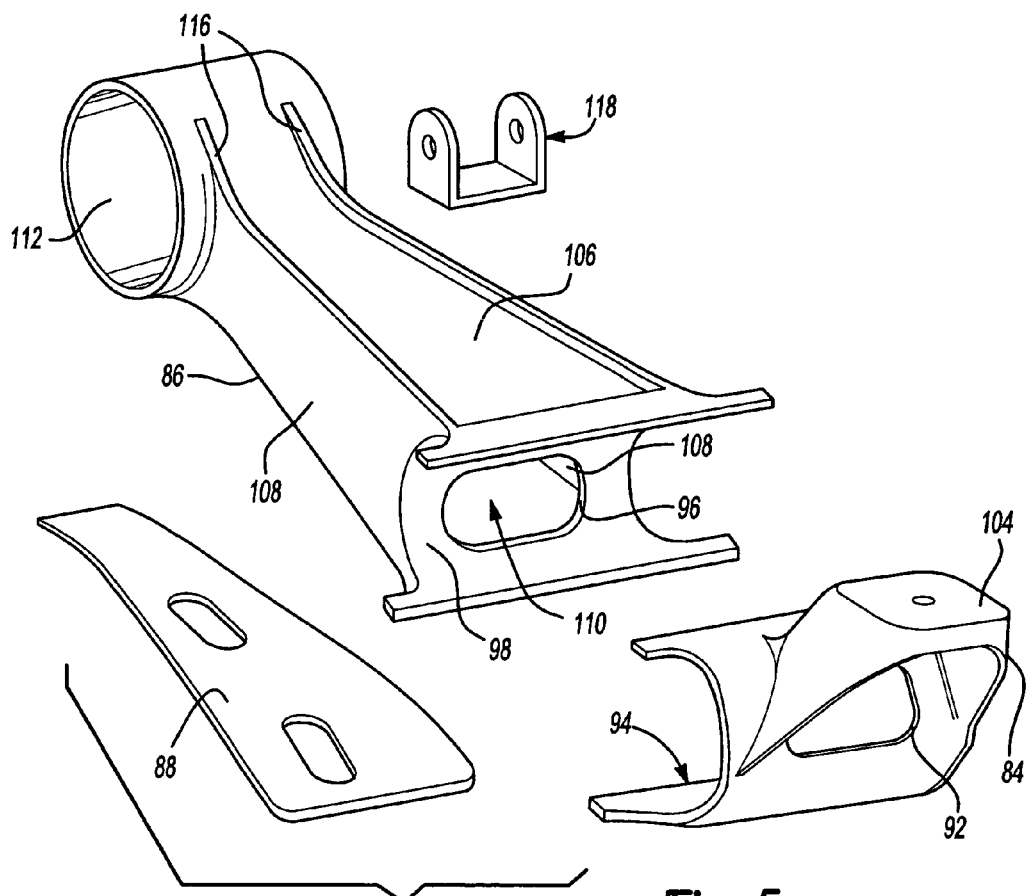
FIG. 5 is an exploded view of one trailing arm assembly from FIG. 4.
Figure 6:
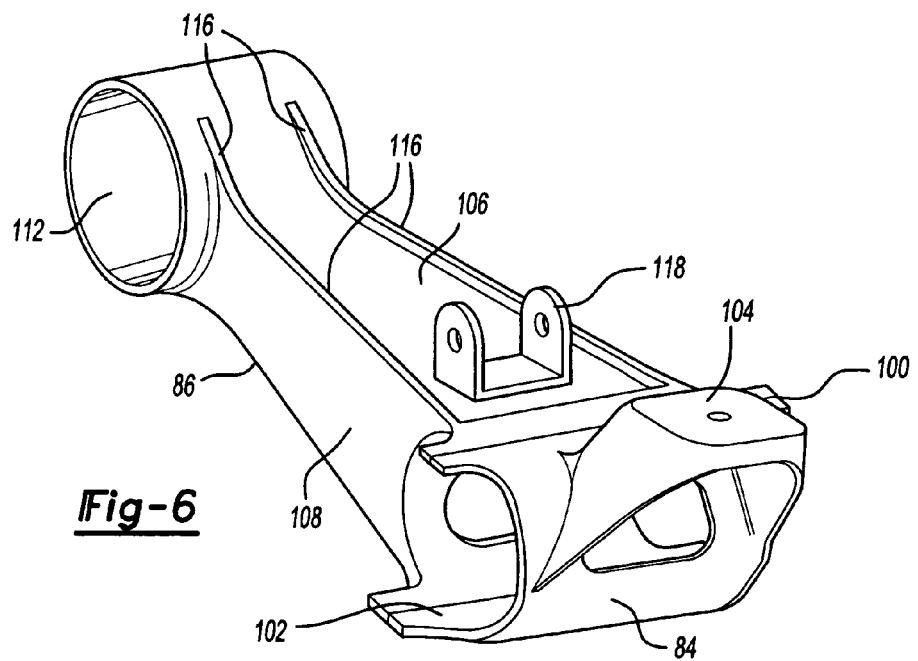
FIG. 6 is a perspective view of the trailing arm assembly of FIG. 5.

FIGS. 4, 5, and 6 show another example of a suspension assembly 80 with a unique pair of trailing arms 82. The suspension assembly 80 is similar to the suspension assembly 18 shown in FIG. 1; except the trailing arms 82 are different than the trailing arms 20.

Each trailing arm 82 includes a first cast component 84, a second cast component 86, and a bottom plate 88. The first 84 and second 86 cast components are first welded to each other. The first 84 and second 86 cast components are then welded to an axle beam 90. The first 84 and second 86 cast components substantially surround the axle beam 90 after welding. The bottom plate 88 is then welded to the second cast component 86.

The first 84 and second 86 cast components and the bottom plate 88 are shown in greater detail in FIGS. 5 and 6. The first 84 and second 86 cast components include weld areas for attachment to the axle beam 90. Again, any known type of welded joint or welding process can be used to join the weld areas to the axle beam 90. In one example, the first cast component 84 includes a first window weld area 92 and defines an inner surface 94 that substantially surrounds one side of the axle beam 90. The second cast component 86 includes a second window weld area 96 and defines an inner surface 98 that substantially surrounds an opposite side of the axle beam 90. The first 84 and second 86 cast components are first welded to each other at 100, 102. The first cast component 84 is then welded to the axle beam 90 via the first window weld area 92 and the second cast component 86 is welded to the axle beam 90 via the second window weld area 96.

The first cast component 84 includes an integrally formed air spring seat 104 that supports a suspension component, such as an air spring. The second cast component 86 includes an upper surface 106 that faces a vehicle frame member, a pair of vertical side walls 108 extending downwardly from opposing edges of the upper surface 106, and an open bottom that defines an internal cavity 110. The second cast component 86 also includes a bushing housing 112 that is integrally formed at one end. The bushing housing 112 is pivotally connected to the vehicle frame member 24, as shown in FIG. 1.

The second window weld area 96 is accessible through the internal cavity 110. Once the second cast component 86 is welded to the axle beam 90, the bottom plate 88 is welded to the second cast component 86. The bottom plate 88 is preferably a stamped piece of sheet metal. The cast components in each of the configurations shown in FIGS. 1-6 are preferably cast steel. Any type of steel can be used, with the grade of steel being determined by vehicle application, suspension type, strength and structural requirements, and/or other factors known in the art.

In the configuration shown in FIGS. 4-6, the second cast component 86 includes flanges 116 that extend upwardly from the opposing edges of the upper surface 106. A generally flat surface is formed between the flanges 116. A shock absorber bracket 118 is then welded to the second cast component 86 at the generally flat surface. The flanges 116 help reduce stress and provide clearance for a shock absorber.

The subject invention provides lightweight and high strength trailing arms 20, 82 that have fewer components, and which are less expensive and less time consuming to assemble compared to prior designs. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A trailing arm assembly for a suspension comprising:
a plurality of cast components including at least a first cast component and a second cast component, said first cast component defining a first weld area and said second cast component defining a second weld area wherein said first and second cast components are separately weldable to an axle beam at said first and second weld areas, and wherein said first cast component includes a first axle wrap portion and said second cast component has a second axle wrap portion and includes an upper surface to face a frame member, a pair of vertical side walls extending downwardly from opposing edges of said upper surface, and an open bottom that defines an internal cavity, said second weld area being accessible via said internal cavity, and wherein said first and said second axle wrap portions are directly attached to each other to form an axle wrap that is to be welded directly to the axle beam at said first and said second weld areas.

2. The trailing arm assembly according to claim 1 wherein said first cast component defines a first inner surface formed to generally surround a portion of the axle beam and said second cast component defines a second inner surface formed to generally surround a remaining portion of the axle beam.

3. The trailing arm assembly according to claim 2 wherein said first and second cast components are welded to each other to substantially surround an outer perimeter of the axle beam prior to being welded to the axle beam at said first and second weld areas.

4. The trailing arm assembly according to claim 1 including an air spring seat integrally formed with said first cast component and a bushing housing integrally formed with said second cast component wherein said bushing housing is rotatably connectable to the frame member.

5. The trailing arm assembly according to claim 1 including a bottom plate welded to said second cast component to substantially enclose said internal cavity.

6. The trailing arm assembly according to claim 5 wherein said pair of vertical side walls each include a cast surface structure and wherein said bottom plate is formed from sheet metal that is directly welded to said cast surface structure.

7. The trailing arm assembly according to claim 1 wherein each of said opposing edges of said upper surface includes an upwardly extending flange.

8. The trailing arm assembly according to claim 1 wherein said first and second weld areas are window welds.

9. The trailing arm assembly according to claim 1 wherein said first cast component supports an air spring and said second cast component is connectable to the frame member.

10. The trailing arm assembly according to claim 9 wherein the axle beam comprises a tubular trailer axle that extends between a pair of wheel ends.

11. The trailing arm assembly according to claim 1 wherein the axle beam comprises a trailer axle that is extendable between a pair of wheels wherein said first and said second cast components are directly welded to the trailer axle.

12. The trailing arm assembly according to claim 11 wherein said first axle wrap portion that surrounds a first portion of the axle beam and wherein said second axle wrap portion surrounds a remaining portion of the axle beam, said first and said second axle wrap portions being directly welded to each other to form said axle wrap that is directly secured to the axle beam via said first and second weld areas.

13. The trailing arm assembly according to claim 1 wherein said first weld area is formed within said first axle wrap portion and wherein said second weld area is formed within said second axle wrap portion, and wherein said first and said second weld areas are positioned directly against an outer surface of the axle beam.

14. The trailing arm assembly according to claim 13 wherein said first weld area comprises a first single window weld and said second weld area comprises a second single window weld, said first and said second single window welds being axially aligned with each other on opposing sides of the axle beam.

15. The trailing arm assembly according to claim 1 wherein said upper surface and said pair of vertical side walls transition directly into said second axle wrap portion which comprises an arcuate surface that bounds said second weld area.

16. The trailing arm assembly according to claim 1 wherein said first and said second axle wrap portions directly surround the axle beam.

17. An axle and suspension assembly comprising:
a tubular axle member that is extendable between a pair of wheels;
a first cast component defining a first weld area for engagement with one side of said tubular axle member, said first cast component including an air spring seat integrally formed with said first cast component; and
a second cast component defining a second weld area for engagement with an opposite side of said tubular axle member, said second cast component including a bushing housing integrally formed with said second cast component where said bushing housing is to be rotatably connectable to a frame member, and wherein said first and second cast components are welded to each other and are separately welded to said tubular axle member at said first and second weld areas to substantially surround an outer perimeter of said tubular axle member, and wherein said first and said second cast components each include an axle wrap portion that is directly welded to said tubular axle member via said first and second weld areas; and
wherein said second cast component has an upper surface facing the frame member, a pair of vertical side walls extending downwardly from opposing edges of said upper surface, and an open bottom that together define an internal cavity, said second weld area being accessible via said internal cavity, and including a bottom plate welded to said second cast component to substantially enclose said internal cavity.

18. The axle and suspension assembly according to claim 17 wherein said tubular axle member comprises a trailer axle beam and wherein said first cast component includes a first axle wrap portion and said second cast component includes a second axle wrap portion that are welded to each other to form an axle wrap that is directly welded to said trailer axle beam, and wherein said first weld area is formed within said first axle wrap portion and said second weld area is formed within said second axle wrap portion with said first and said second weld areas being positioned directly against an outer surface of said trailer axle beam.

19. The axle and suspension assembly according to claim 18 wherein said first weld area comprises a first single window weld and said second weld area comprises a second single window weld, said first and said second single window welds being axially aligned with each other on opposing sides of said trailer axle beam.

20. A method of attaching a trailing arm assembly to an axle component comprising:
(a) forming first and second cast components with axle wrap portions and welding the first and second cast components to each other;
(b) welding the first cast component to an axle component via a first weld area wherein the axle component comprises an axle that is extendable between a pair of wheels;
(c) welding the second cast component to the axle component via a second weld area such that the first and second cast components substantially surround an outer perimeter of the axle component and wherein the axle wrap portions are directly welded to the axle at the first and second weld areas; and
(d) welding a third component to the second cast component subsequent to step (c) to close access to the second weld area.

21. The method according to claim 20 wherein the third component comprises a bottom plate and including integrally forming an air spring seat on the first cast component for supporting an air spring, integrally forming a bushing housing on the second cast component for connection to a frame member, accessing the second weld via an internal cavity formed within the second cast component during step (c), and welding the bottom plate to the second cast component to substantially enclose the internal cavity subsequent to step (c).

22. The method according to claim 20 wherein the axle comprises a trailer axle beam and including attaching the axle wrap portions of the first and second cast components to each other to form an axle wrap that directly surrounds the trailer axle beam, forming the first weld area in the axle wrap portion of the first cast component, and forming the second weld area in the axle wrap portion of the second cast component.

23. The method according to claim 22 including forming the first weld area as a first single window weld, forming the second weld area as a second single window weld, and aligning the first and the second single window weld areas axially with each other on opposing sides of the trailer axle beam.

* * * * *